United States Patent

Aby et al.

[11] 3,766,817
[45] Oct. 23, 1973

[54] FOOD SLICER

[75] Inventors: John F. Aby, Kewanee, Ill.; James L. Davis, Placentia, Calif.

[73] Assignee: Prodyne Enterprises, Los Angeles, Calif.

[22] Filed: Dec. 6, 1971

[21] Appl. No.: 205,061

[52] U.S. Cl................... 83/581.1, 83/467, 83/609, 83/651.1, 83/698
[51] Int. Cl......... B26d 5/10, B26d 3/16, B26d 1/30
[58] Field of Search.................... 83/467, 607, 608, 83/609, 651.1, 662, 698, 581.1

[56] References Cited
UNITED STATES PATENTS

| | | | |
|---|---|---|---|
| 1,796,212 | 3/1931 | Nadeo............................ | 83/651.1 X |
| 831,610 | 9/1906 | Hummer....................... | 83/651.1 X |
| 2,037,856 | 4/1936 | Filippi............................ | 83/651.1 |

Primary Examiner—Willie G. Abercrombie
Attorney—Keith D. Beecher et al.

[57] ABSTRACT

An improved slicing device is provided for foods such as cheese, butter, fruit, vegetables or the like, for cutting the food into slices of any desired thickness. The device to be described comprises a base which provides a flat cutting surface, and it also includes a cutting element, such as a wire, or blade, which extends transversely across the base, and which is mounted on a U-shaped bar in such a way that when the bar is turned, the wire is pivoted downwardly into a transverse slot in the base to perform its slicing function. A feature of the invention is the manner in which the cutting element serves to hold the U-shaped bar in the base. A further feature of the invention is the provision of a handle on the aforesaid bar, and to which the cutting element is attached. The handle may be turned to remove the tension on the wire to permit replacements to be made, and also to draw the cutting element taut so that it may properly perform its cutting function.

7 Claims, 2 Drawing Figures

PATENTED OCT 23 1973

3,766,817

INVENTORS:
John F. Aby
James L. Davis
By Keith D. Beecher
ATTORNEYS

FOOD SLICER

BACKGROUND OF THE INVENTION

Cutting and slicing devices of various types are known to the art, by which a wire, or other cutting member, is turned down on a base to perform a cutting function. However, the prior art devices are subject to certain disadvantages, the major disadvantages lying in the difficulty for the prior art devices to provide a simple and adequate means for holding the components of the device in the base; to provide some means for maintaining the cutting wire in a taut condition; or to provide a convenient means for replacing the cutting wire should it break. These disadvantages are overcome by the improved construction of the present invention.

DETAILED DESCRIPTION OF THE ILLUSTRATED EMBODIMENT

Figure 1:
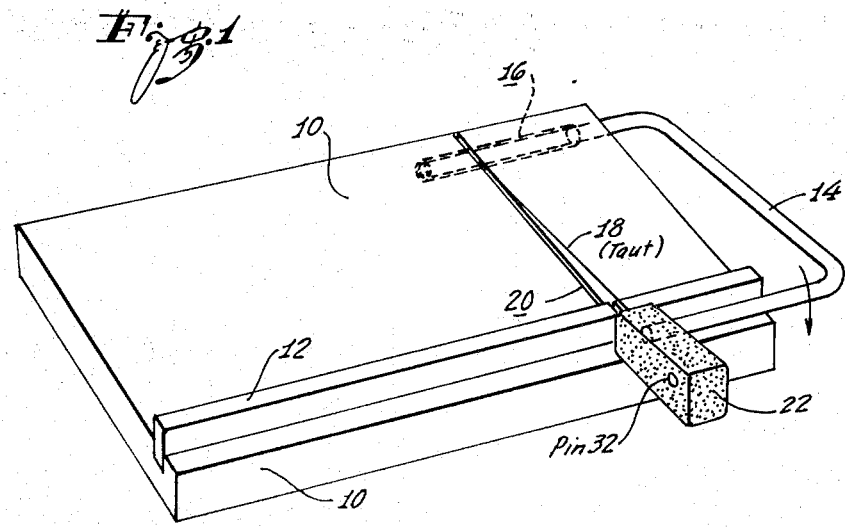
FIG. 1 is a perspective representation of a slicing device constituting one embodiment of the invention and having its handle turned to hold the cutting wire taut.

The food slicing device shown in the drawing includes a base 10 which, as mentioned above, provides a flat cutting surface for the unit. A guide rail 12 is provided at one side of the base 10 which serves as a further support and guide for the food which is to be sliced by the unit.

The unit also includes a U-shaped bar 14 which has a first leg extending into a passageway 16 in the base 10. The passageway 16 is oversize with respect to the diameter of the leg of the bar 14 so there will be no tendency for the bar to seize in the base. The passageway 16 extends adjacent one side of the base from the right-hand end in FIG. 1. The U-shaped bar 14 may be turned pivotally about the axis of the passageway 16, so as to swing a cutting member, such as a stainless steel wire 18 down into a slot 20 which extends transversely across the base. The cutting wire 18 is attached at one end to the end of the leg of the bar 14 in the passage 16, and it serves to retain the bar in assembled condition with the base, when the wire is taut.

The other end of the cutting wire 18 is held by a handle 22 which, in turn, is mounted on the end of the other leg of the bar 14. As will be described, the handle 22 may be turned about the axis of the last-named leg, so as to draw the cutting wire 18 taut, thereby to provide a simple mounting means for the cutting wire, and a simple means for maintaining the wire in a taut condition, and for permitting replacement of the wire should it become broken.

In order to slice food, such as cheese by the unit of the invention, the cheese is placed on the flat surface of the base 10 adjacent the guide rail 12. The bar 14 is then turned about the axis of the passageway 16 so that the cutting wire 18 is turned up and away from the upper surface of the base. The cheese is then moved forwardly across the transverse slot 20, with the forward part of the cheese extending beyond the slot by an amount corresponding to the thickness of the desired slice. Then, the cheese is held with the left hand of the operator, and the right hand is used to rotate the member 14 about the axis of the passageway 16; and by pressing down on the handle 22, to cause the cutting wire 18 to pass through the cheese and down into the slot 20, so that the desired slice of cheese is cleanly and completely removed.

The base 10, for example, may be formed of appropriate wood, plastic or other material. A constructed embodiment has the dimensions of 8 × 5 × ¾ inches, so that the unit may be readily portable. The transverse slot 20 in the surface of the base assures that each slice will be made completely through the body of the cheese. The end of the wire 18 is looped around the portion of the leg of the bar 14 traversing the passageway 16. Thus, the leg of the bar not only forms a fulcrum for the wire, but the wire also serves to hold the leg of the bar 14 within the passageway 16, so that no other mounting means is required.

The U-shaped bar 14 may be composed, for example, of chrome-plated stress-proof steel. The stress-proof steel is preferred at present, since it maintains its resiliency throughout the life of the device, and it has no tendency to deform when under tension during the cutting stroke. The size and orientation of the bar 14 in the constructed embodiment enables cheeses up to 4 inches square to be sliced into slices up to 3 inches thick, by way of example.

The cutting member 18 in the constructed embodiment is a stainless steel cutting wire. The mounting of the cutting wire on the bar 14 in accordance with the invention provides a high tension of the order, for example, of 50 pounds. This high tension assures cutting the hardest cheeses, and other food products, in uniform slices. The replaceability of the wire in accordance with the invention enables the unit of the invention to be used indefinitely, and to be virtually wear-proof.

The handle 22 may be formed of plastic, and it performs several functions. For example, the member 22 provides the handle which is grasped to perform the cutting operation. The handle 22 also serves as a means for attaching the cutting wire 18 to the free end of the bar 14. An important feature of the handle 22 is that it serves as a lever which can be turned to a first angular position (FIG. 2) to relieve the tension in the wire 18 so that the wire may be easily replaced; and which may be turned to a second angular position, as shown in FIG. 1, in which a high tension is placed on the wire, as is desired for the reasons expressed above.

Figure 2:
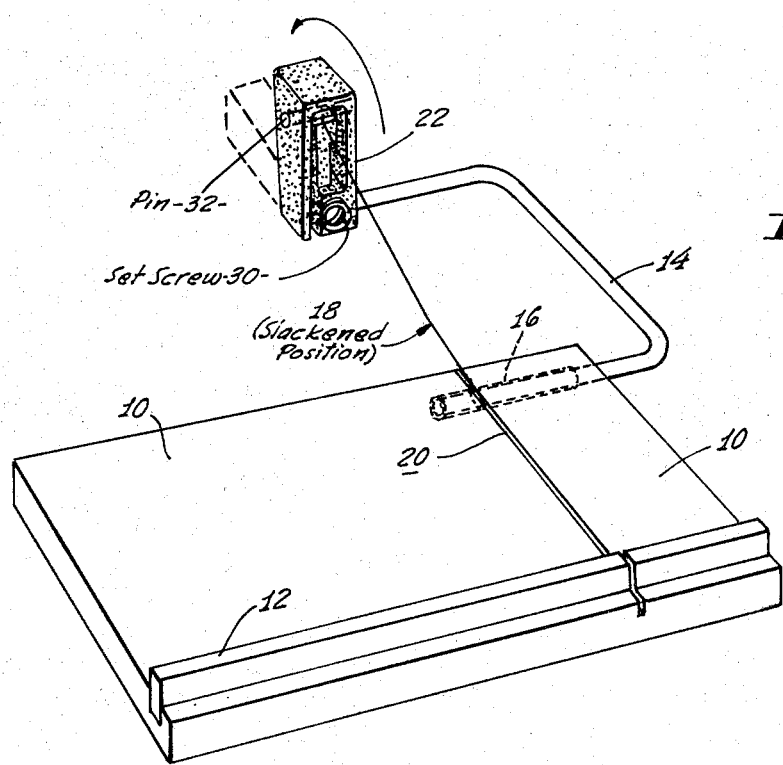
FIG. 2 is a perspective view, showing the manner in which the handle of the device of FIG. 1 may be adjusted to slacken and permit replacement of the cutting wire.

As shown in FIGS. 1 and 2, the handle 22 is rotatably mounted on the free end of the bar 14, and may be turned in a direction opposite to the arrow of FIG. 2 to remove the tension on the cutting wire 18. This permits the cutting wire to be removed, and a new cutting wire to be installed into the unit. This is achieved, for example, by forming a loop in one end of the cutting wire 18, and by sliding the leg of the bar 14 into the passageway 16 until it slightly protrudes into the cutting slot 20. The loop at the end of the cutting wire 18 is then threaded over the end of the bar 14, and the bar is then pushed fully into place with its end extending across the slot 20, and with the cutting wire 18 looped in place.

The other end of the cutting wire 18 is then looped around a pin 32 in the handle 22, as shown in FIG. 2, the axis of the pin being displaced radially from the axis of rotation of the handle 22. The handle 22 is then turned in the direction of the arrow in FIG. 2, so as to impart a high tension to the cutting wire 18, and the handle is locked in place by a set screw 30. As mentioned above, the cutting wire 18 is looped around the pin 32, which extends into the handle 22, as shown in FIG. 2. The wire serves to retain the pin 32 in the handle when the wire is in the taut condition of FIG. 1.

The invention provides, therefore, an improved slicing device for cutting cheese, butter, and other food products. The device of the invention is relatively simple to construct, and it may be sold at a relatively low price. The unit may be constructed to be strong and durable, so as to be virtually wear-proof. The cutting wire may be replaced in a simple and uncomplicated manner, and may be easily and quickly installed into the unit under high tension for efficient cutting action.

It will be appreciated that while a particular embodiment of the invention has been shown and described, modifications may be made. It is intended in the following claims to cover all such modifications which come within the spirit and scope of the invention.

What is claimed is:

1. A slicing device for cheese and the like, comprising: a base providing a flat cutting surface and having a passageway extending inwardly from an edge thereof parallel to said flat cutting surface and displaced down from the plane thereof; a bar having a generally U-shape with one leg extending into said passageway for pivotal movement of said bar about the axis of said passageway; a cutting element extending transversely across said base and having one end secured at the pivot axis of said bar; a handle rotatably mounted on the other leg of said bar and rotatable about the longitudinal axis of said other leg between a first and a second angular position, said cutting element being secured to said handle at a point displaced from the axis of rotation thereof to be drawn taut when said handle is turned to said second angular position; and set-screw means extending through said handle into engagement with said other leg of said U-shaped bar for setting said handle at said second angular position.

2. The combination defined in claim 1, in which said cutting element comprises a wire.

3. The combination defined in claim 2, in which said base has a transverse slot formed therein for receiving said wire.

4. The combination defined in claim 3, in which said passageway extends transversely across said slot, and one end of said wire is looped around the portion of said one leg traversing said slot so that said one leg forms a fulcrum for said wire and said wire serves to maintain the leg in said passageway.

5. The combination defined in claim 1, and which includes a pin extending transversely across said handle, one end of said cutting element being attached to said pin.

6. A slicing device for cheese, and the like, comprising: a base providing a flat cutting surface and having a transverse slot therein, and said base further having a passageway therein, said passageway extending inwardly from an edge of said base parallel to said flat cutting surface and displaced downwardly therefrom and extending inwardly across said slot; said bar having a generally U-shape with one leg extending into said passageway and across said slot for pivotal movement of said bar about the axis of said passageway; and a cutting element attached to said bar to be received in said slot, said cutting element having one end looped around the portion of said one leg traversing said slot, whereby said one leg forms a fulcrum for said cutting element, and said cutting element serves to hold said leg in said passageway.

7. The combination defined in claim 6, and which includes means mounted on the other leg of said U-shaped bar for drawing said cutting element to a taut position.

* * * * *